United States Patent [19]

Kisovec

[11] 3,994,404

[45] Nov. 30, 1976

[54] PORTABLE MIXING PLANT FOR CONCRETE AND THE LIKE

[76] Inventor: Jean-Francis Kisovec, 33 Brunswick St., Apt. 319, Dollard des Ormeaux, Quebec, Canada, H9B 1P4

[22] Filed: July 16, 1975

[21] Appl. No.: 596,461

[52] U.S. Cl. .................................. 214/2; 198/504; 177/119; 177/122
[51] Int. Cl.² .................. B65G 69/00; G01G 13/08
[58] Field of Search ............ 214/2; 198/39; 177/59, 177/62, 70, 121–123, 119, 120

[56] References Cited
UNITED STATES PATENTS

| | | | |
|---|---|---|---|
| 2,048,877 | 7/1936 | McCrery | 214/2 |
| 2,496,548 | 2/1950 | LaRosa et al. | 198/39 |
| 2,587,531 | 2/1952 | Saxe | 177/70 X |
| 2,727,733 | 12/1955 | Carswell | 177/70 |
| 3,477,529 | 11/1969 | Burn et al. | 177/120 X |
| 3,897,868 | 8/1975 | Smith | 198/39 X |

FOREIGN PATENTS OR APPLICATIONS 986,884  3/1965  United Kingdom .................. 177/70

Primary Examiner—Robert S. Ward, Jr.

[57] ABSTRACT

A mixing plant which is portable and adapted to mix material, such as for on-the-site mixing of concrete and the like, and which mounts on a truck to be readily transported from site to site. This mixing plant includes four transportable units mounted on a truck and each comprising a belt conveyor, a weighing system operatively carrying the conveyor and adapted to weigh material on the top run of the latter, a hopper mounted above the belt conveyor and including a coarse dispensing outlet and a fine dispensing outlet with the latter positioned a predetermined distance from the coarse dispensing outlet and downstream of the latter relative to the displacement of the top run of the conveyor, a levelling bar of adjustable height extending lengthwise transversely of the conveyor between the two dispensing outlets, and with trap doors and actuators to adjust the opening and closing of the outlets.

13 Claims, 4 Drawing Figures

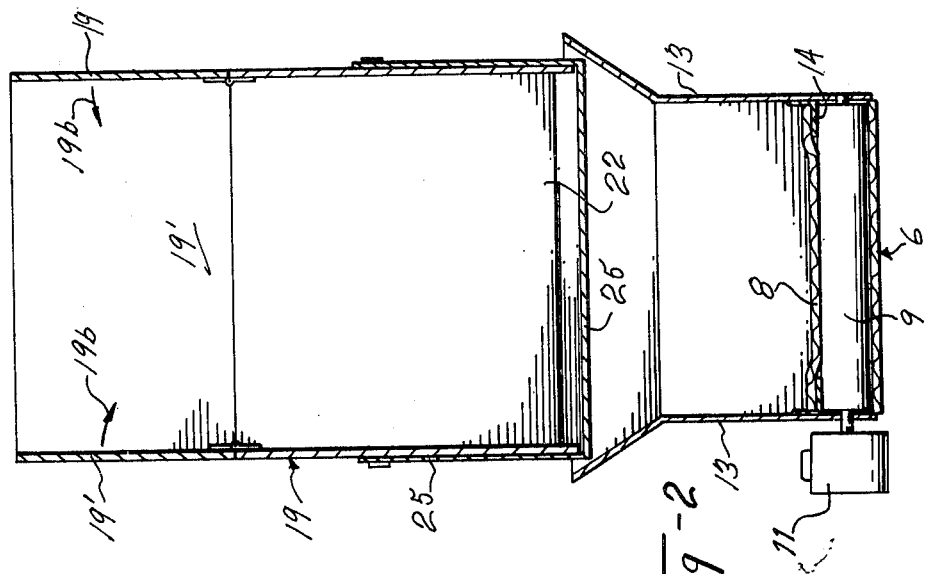
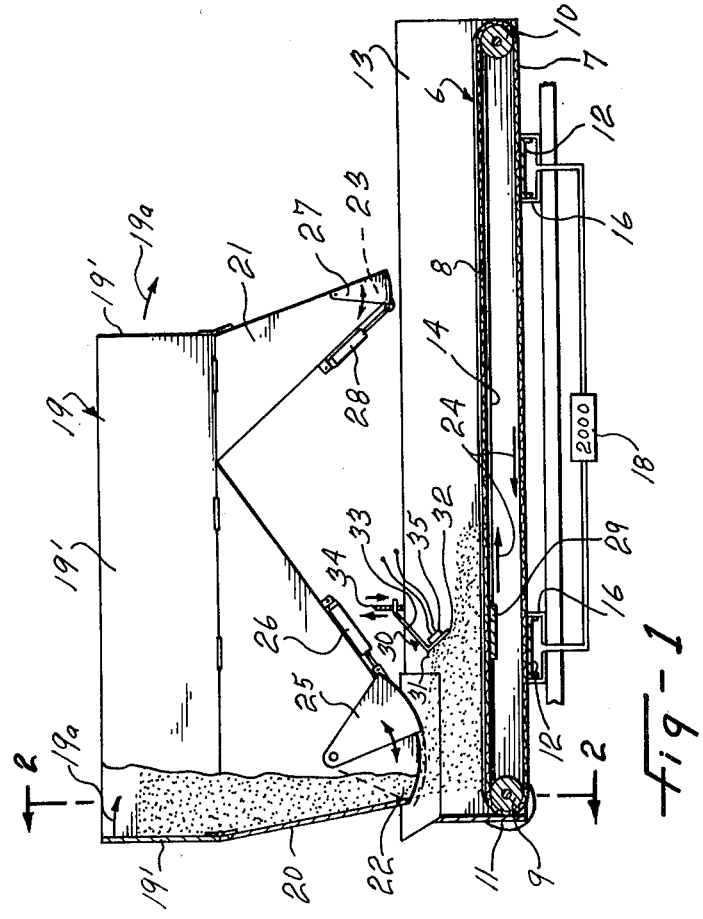

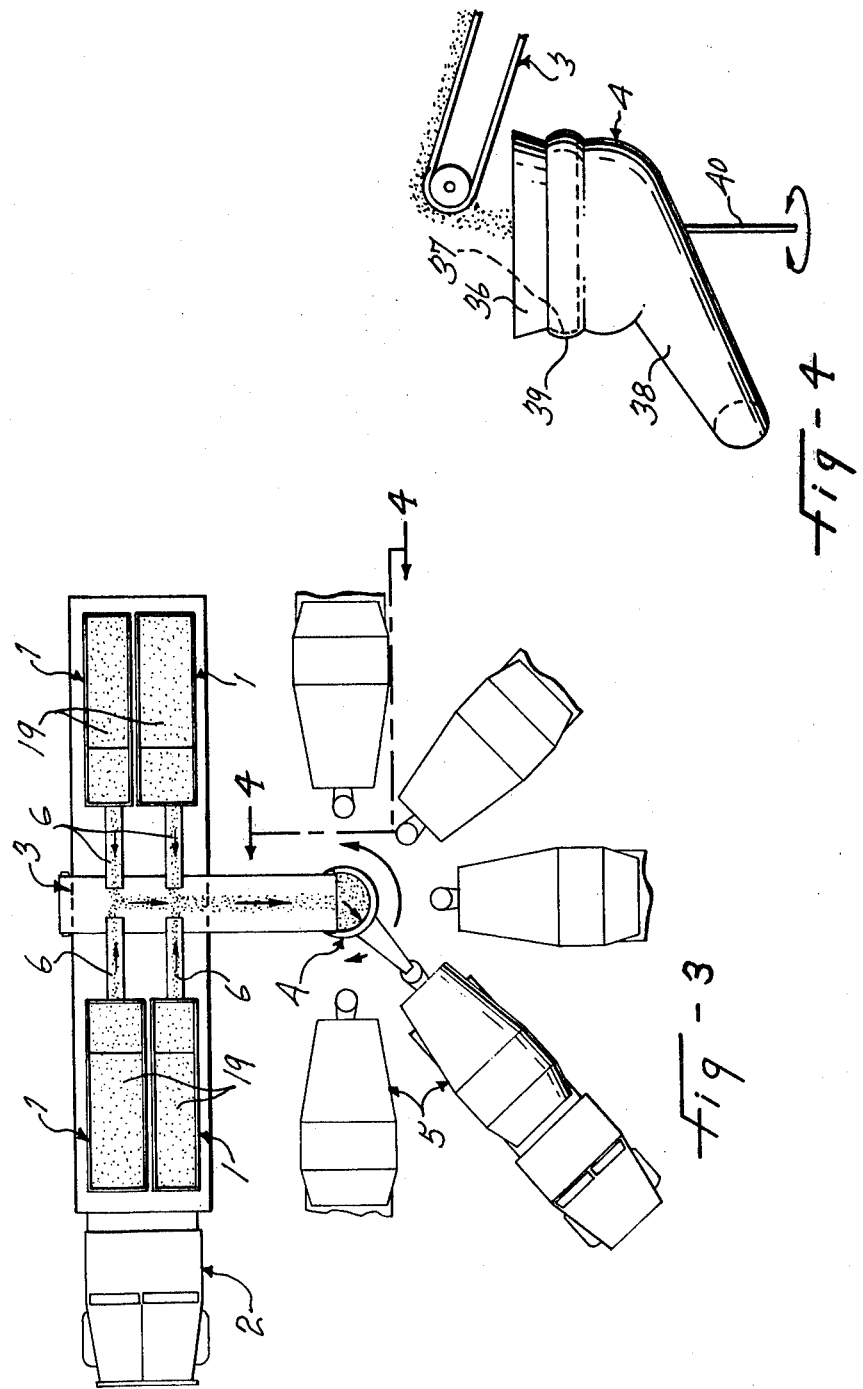

PORTABLE MIXING PLANT FOR CONCRETE AND THE LIKE

This invention relates to a portable mixing plant, more particularly of the type adapted for on-the-site mixing of concrete.

Large constructions, such as hydro-electric projects, dams, bridges and airports, require loads and loads of ready-mix concrete and the use of ready-mix trucks to supply these loads from a remote concrete mixing plant has proved to be an inefficient way to meet this requirement.

The installation of semi-permanent on-the-site concrete mixing plants has anteriorly been proposed, but such plant uses relatively large holding tanks or containers and, therefore, are not readily portable or transportable and, thus, still present disadvantages of a remote mixing plant.

It is a general object of the present invention to provide a mixing plant more particularly of the above type which is portable and of appropriate size to be easily transported from site to site and which has a much greater mixing capacity than known so-called portable mixing plants.

It is a more specific object of the present invention to provide a mixing plant, more particularly of the above type, which mounts on a conventional truck and thus allows readily displacement from site to site and set-up in a short time.

It is another object of the present invention to provide a mixing plant for concrete and the like material which pre-mixes the right amounts of dry materials to a much greater extent than known portable mixing plants and thus reduces the mixing time with water.

The above and other objects and advantages of the present invention will be better understood with the following detailed description of a preferred embodiment thereof, which is illustrated, by way of example, in the accompanying drawings, in which:

FIG. 1 is a side elevation and longitudinal section of a transportable mixing plant unit according to the present invention;

FIG. 2 is a cross-sectional view as seen along line 2—2 in FIG. 1;

FIG. 3 is a top view particularly illustrating the layout of a concrete mixing plant according to the present invention; and FIG. 4 is an elevation view of a truck loading and distribution device of the mixing plant, as seen along line 4—4 in FIG. 3.

The illustrated concrete mixing plant, as shown in FIG. 3, includes four transportable mixing and measuring units 1 mounted in two pairs of side-by-side units on a single truck 2, a collecting belt conveyor 3 and a truck loading and distribution device 4 arranged to supply the dry concrete ingredients for ready-mix trucks 5. Although four units 1 are shown on one truck 2, it is possible to mount a variable number of units on each truck 2 and to vary the number of trucks 2 associated with conveyor 3. Each transportable unit 1 may carry a particular material or concrete ingredient, such as cement, aggregate or sand. In the example shown, one unit is for cement; one unit for sand; and the two other units are for two different sizes of crushed stone.

Each transportable mixing and measuring unit 1 includes an endless belt conveyor 6 schematically represented by an endless conveyor belt 7 defining a top run 8, end rollers 9 and 10 and a motor 11 driving the roller 9 and the belt 7. The endless belt conveyor is mounted on a frame including the crossbars 12 and the side walls 13. As shown in FIG. 2, the side walls 13 extend against the opposite lateral edges of the upper run 8 of the conveyor belt and include inner flanges 14 supporting these lateral edges.

A weighing system carries the frame formed of the elements 12 and 13 and thus also carries the corresponding belt conveyor 6. The weighing system is schematically represented by a pair of cylinder and piston units 16 with their pistons supporting the crossbars 12, hydraulic lines 17 and pressure responsive weight indicator 18. The details of this hydraulic weighing system do not form part of the present invention; it could be replaced by a conventional beam type balance.

Each of the afore-mentioned transportable dispensing units 1 also includes a hopper 19 mounted above the corresponding belt conveyor 6 and including a pair of chutes 20 and 21 ending at the bottom by a coarse dispensing outlet 22 and a fine dispensing outlet 23. The chutes 20 and 21 are defined by inclined walls, the angle of which exceeds the angle of repose of the material to be dispensed from the hopper. The top of hopper 19 is formed by hinged panels 19' which can be folded, as indicated by arrows 19a, 19b, when hopper 19 is empty to facilitate travel of truck 2. The outlet 22 is larger and determined to coarsely dispense the material from the hopper, while the outlet 23 is smaller and determined to finely dispense the material from the hopper. The arrows 24 indicate the direction of linear displacement of the conveyor belt 7. Thus, the fine dispensing outlet 23 is positioned downstream of the coarse dispensing outlet 22 relative to the afore-mentioned direction of displacement 24. Both outlet overly the conveyor belt 7 and are spaced apart a distance at least equal to the factor Wh/V wherein V is the volume of the desired load of material which is to be dispensed less, say, 10%; W is the width of the upper run of the conveyor; and h is the height of the lower edge of a levelling bar 30 above upper conveyor run 8. Such distance between the two outlets allows the coarse dispensing outlet 22 to finish spreading its share of the desired load L on the conveyor belt before the spreaded material arrives under the fine dispensing outlet 23. The weighing system 15 thus measures the amount of coarsely dispensed material and indicates the amount of fine dispensing required to complete the load, this last amount being, for example, 10% of the total load.

The coarse dispensing outlet 22 is adjustably opened and closed by a pivoted trap door 25 operated by a hydraulic cylinder 26 secured against an outside face of the chute 20. Similarly, the fine dispensing outlet 23 is adjustably opened and closed by a pivoted trap door 27 operated by a hydraulic cylinder 28 secured against an outside face of the chute 21.

A device is provided intermediate the two outlets 22 and 23 to level, compact and regulate the coarsely dispensed material along the upper run of the conveyor belt. This device includes a back-up plate 29 slidably supporting the upper run 8 and a levelling bar 30 extending transversely of the conveyor belt in overlying relationship with the latter. The levelling bar has a transverse V-shape cross-section defining an apex 31 and includes a bottom plate portion 32 and a top plate portion 33. The levelling bar 30 is adjustable in height by a motor-operating screw 34 remotely controlled by an electronic circuit system. The bottom plate portion 32 projects downstream and downwardly from the apex 31 and carries a compaction vibrator 35 to level and compact the coarsely dispensed material. The top plate portion 33 projects downstream and upwardly from the apex 31, such that any excess of material piled higher than the apex 31 will temporarily accumulate on this top plate portion 33 and eventually drop back in front of apex. The bottom edge of bottom plate portion 32 thus regulates the thickness of material on the conveyor belt. The walls 13 serve to laterally confine the material on the belt while the back-up plate 29 allows a uniform height of material.

The trap door 25 opens such that nearly the full load is dispensed by the coarsely dispensing outlet 22. When this amount has been weighed by the weighing system 15, trap door 25 closes and trap door 27 opens and closes in rapid succession the right amount of time to dispense the rest of the material to provide the full load. It will be noted that with the afore-mentioned spacing between the two outlets the finely dispensed material is spreaded over the coarsely dispensed material. The conveyor downstream of the fine dispensing outlet 23 is of sufficient length such that the entire load will be weighed together before the material starts to fall on the collecting conveyor 3. Final closing of the trap door 27 occurs when the exact load has been measured. Both trap doors 25 and 27 are electrically and automatically controlled by an electrical circuit, in turn controlled by a pressure responsive transducer controlling also indicator 18.

The desired ingredients, such as cement, sand and aggregates, may thus be measured by the different units 1 and discharged onto the belt conveyor 3 which discharges into the truck loading and distribution device 4, as seen from FIGS. 3 and 4.

The truck loading and distribution device 4 includes a fixedly mounted ring including a mouth portion 36 and a spherical support portion 37. A distribution funnel 38 is formed with a spherical portion 39 forming with the portion 36 a spherical connection swivelly suspending the funnel from the fixed support member. Thus, the distribution funnel 38 is allowed 360° swivelling and also some pendular motion at the spherical connection. A motor, not shown, is connected to the upright shaft 40 to thus swivel the distribution funnel 38. The dry concrete ingredients may thus be loaded in ready-mix trucks 5 angularly positioned around the device 4.

It will be readily understood that the afore-described portable mixing plant and, in particular, the transportable units 1 may be used to measure and dispense other materials.

In order to obtain as complete pre-mixing of the dry materials as possible on the collector conveyor 3, the four units 1 are controlled by a common electrical circuit in such a manner that the conveyor belts 6 travel at equal speeds and that the materials start to be dispensed from the four units at the same time and ceased to be dispensed also simultaneously. Thus, a homogeneous mixture is obtained on conveyor 3, thus reducing the time necessary for mixing with water in the ready-mix trucks 5. Thus, the main trap doors 25 of the four units 1 open and close simultaneously. Also, due to the differences in the specific gravities of the cement, sand and aggregates, the levelling bars 30 of the four units 1 are automatically vertically adjusted in accordance with the specific gravity of the material handled in the specific units 1, such that the lengths of the four ribbons of materials discharged through main outlets 22 in units 1 are substantially equal, being at the most equal to the distance between outlets 22 and 23.

The make-up material dispensed from fine dispensing outlet 23 is laid entirely over the ribbon of material dispensed from coarse outlet 22. As soon as weighing is completed for one batch, the trap door 25 for coarse outlet 22 opens to start dispensing for the next batch. This occurs much before the first batch has been completely discharged from belt conveyor 6.

From the above-described operation of the system, it will be appreciated that a minimum of downtime occurs and that, consequently, the system of the invention has a much greater capacity than known systems of much larger size. In such known systems, the material must first be discharged from a holding bin into a weighing bin and, after weighing, the material is discharged from the weighing bin onto a conveyor. In the present system, the time required for filling, weighing and emptying the weighing bin is eliminated, since weighing is carried on on the conveyor belt itself. Also, a decrease in size is obtained, since the weighing bin is eliminated. Preferably, the relation between the size of the coarse dispensing outlet 22 and the travelling speed of the conveyor 6 is such that the material is allowed to pile up on the belt 6 to the outlet 22 before trap door 25 closes. Thus, the latter exerts a shearing action through the material.

The indicated weight at which closing of trap door 25 takes place is thus not the actual weight of the material below the trap door once closed, but includes a portion of the weight of the material in the hopper 19 which depends on the arching tendency of the material and on the inclination of the hopper walls. However, a few trials will easily determine the indicated weight, causing trap door 25 to close to close for any given type of material. For materials which are highly free flowing, such as dry sand; it may be necessary to mount a V-shaped baffle in the hopper 19 just above outlet 22 to support the major portion of the material in the hopper, while allowing fast discharge of the material from the hopper.

The above manner of dispensing the material from outlet 22 of the hopper 19 enables to set the level of outlet 22 at a small distance above conveyor belt 6, thus reducing the overall height of the unit.

Trap door 27 for the fine dispensing outlet 23 is operated in a "jogging" manner, namely in accordance with a rapid succession of opening and closing movements to thus prevent piling of the material up to the trap door 27. Thus, precise final weighing is obtained.

What I claim is:

1. A portable mixing plant for concrete and comprising one transportable unit including a belt conveyor, a weighing system carrying the latter and arranged for weighing of material on the conveyor, and a hopper mounted above the latter and having a coarse dispensing outlet and a fine dispensing outlet overlying the conveyor and longitudinally spaced along the latter with the fine dispensing outlet positioned downstream of the coarse dispensing outlet relative to the direction of travel of the upper run of the belt conveyor.

2. A portable mixing plant as defined in claim 1, wherein said transportable unit includes a levelling device positioned intermediate the coarse dispensing outlet and the fine dispensing outlet and arranged to level the coarsely dispensed material on the upper run of the belt conveyor.

3. A portable mixing plant as defined in claim 2, wherein said levelling device includes a levelling bar extending lengthwise transversely of the upper run and adjustable in height relative to the latter.

4. A portable mixing plant as defined in claim 3, wherein the levelling bar has a transverse V-shape cross-section defining an upstream apex and includes a bottom and a top blades projecting downstream downward and upward respectively from the apex.

5. A portable mixing plant as defined in claim 4, wherein said one transportable unit includes a compaction vibrator secured to the levelling bar and operatively compacting the coarsely dispensed material upon levelling engagement therewith, and an actuator connected to the levelling bar and selectively effecting height adjustment thereof.

6. A portable mixing plant as defined in claim 4, wherein said outlets are spaced apart a distance at least equal to the factor Wh/V wherein V is a little less than the volume of the desired load of material which is to be dispensed; W is the width of the upper run of the conveyor; and h is the height of the lower edge of the bottom blade above said upper conveyor run.

7. A portable mixing plant as defined in claim 5, wherein the hopper includes a trap door for closing each of said outlets and a hydraulic actuator connected to each of the trap doors and opening and closing the latter.

8. A portable mixing plant as defined in claim 1, including at least two transportable units arranged side by side and mounted on a vehicle, and a loading device located to receive material discharged from the belt conveyors of both units.

9. A portable mixing plant as defined in claim 8, wherein said loading device includes a swivelling distribution funnel pivotable to load a ready-mix truck at any loading position angularly around the distribution funnel.

10. A portable mixing plant as defined in claim 9, wherein said distribution funnel includes a fixed top mouth portion, a spherical connection suspending the distribution funnel to the fixed top mouth portion, and a hydraulic actuator connected to the distribution funnel and selectively swivelling the latter to any predetermined loading position.

11. A portable mixing plant as defined in claim 4, wherein the upper run of the belt conveyor has opposite lateral edges, the transportable unit includes a back-up plate supporting the upper run in underlying relationship relative to the levelling bar and a pair of spaced-apart walls extending against said opposite lateral edges, laterally confining the material on the upper run of the belt conveyor and each having an inward flange supporting said opposite lateral edges.

12. A portable mixing plant as defined in claim 8, wherein the unit includes a levelling bar extending transversely of the upper run and adjustable in height relative to the latter, both units dispensing material of different specific gravities, the adjusted levels of the respective levelling bars depending on said specific gravities and being such that the ribbons of material dispensed by the coarse dispensing outlet and levelled by the levelling bar in both units have substantially equal lengths at the most equal to the distance separating the coarse and fine dispensing outlets longitudinally of the belt conveyor.

13. A portable mixing plant as defined in claim 12, further including trap doors for closing the coarse dispensing outlets of both units, said trap doors opening and closing substantially simultaneously.

* * * * *